United States Patent [19]
Wang

[11] Patent Number: 5,758,345
[45] Date of Patent: May 26, 1998

[54] PROGRAM AND METHOD FOR ESTABLISHING A PHYSICAL DATABASE LAYOUT ON A DISTRIBUTED PROCESSOR SYSTEM

[75] Inventor: James Chien Wang, Hopewell Junction, N.Y.

[73] Assignee: International Business Machines Corporation, Armonk, N.Y.

[21] Appl. No.: 555,025

[22] Filed: Nov. 8, 1995

[51] Int. Cl.$^6$ .................................................. G06F 17/30
[52] U.S. Cl. .......................... 707/100; 707/200; 707/206; 395/401; 395/405; 395/800
[58] Field of Search .................................. 395/600, 401, 395/405, 800; 707/10, 200, 206

[56] References Cited

U.S. PATENT DOCUMENTS

| | | | |
|---|---|---|---|
| 4,887,204 | 12/1989 | Johnson et al. | 364/200 |
| 5,121,494 | 6/1992 | Dias et al. | 395/600 |
| 5,129,088 | 7/1992 | Auslander et al. | 395/700 |
| 5,179,702 | 1/1993 | Spix et al. | 395/650 |
| 5,216,592 | 6/1993 | Mann et al. | 364/401 |
| 5,237,691 | 8/1993 | Robinson et al. | 395/700 |
| 5,249,270 | 9/1993 | Stewart et al. | 395/200 |
| 5,437,032 | 7/1995 | Wolf et al. | 395/650 |
| 5,448,727 | 9/1995 | Annevelink | 395/600 |
| 5,551,027 | 8/1996 | Choy et al. | 395/600 |

FOREIGN PATENT DOCUMENTS

| | | | |
|---|---|---|---|
| 08137910 | 5/1996 | Japan | 395/600 |

OTHER PUBLICATIONS

Lu et al. "Dynamic and Load-balanced Task-Oriented Database query Processing in Parallel Systems" pp. 357-372, Jan. 1992.

SUN "SPARCstorage Array User's Guide" pp. 1-1-2-13, May 1994.

Stamos et al. "A Symmetric fragment and replicate algorithm for distributed" IEEE vol. 4 pp. 1345-1354, Dec. 1993.

Hua et al. "Dynamic load balancing in very large shared-nothing hypercub" vol. 42, pp. 1425-1439, Dec. 1993.

Wolf et al. "A parallel hash join algorithm for managing data shew" IEEE vol. 4 No. 12 pp. 1355-1371, Dec. 1993.

Wolf et al. "A parallel sort merge join algorithm for managing data skew" IEEE vol. 4 No. 1 pp. 70-86, Jan. 1993.

Dewwit et al. "The future of high performance database systems" ACM vol. 35, No. 6 pp. 85-97, Jun. 1992.

Wolf et al. "An Effective Algorithm for Parallelizing Sort Merge joins in the Presence of Data Skew" IEEE, pp. 103-115, Jan. 1990.

"Automating Database Implementation", G. E. Bryans, IBM Technical Disclosure Bulletin, vol. 38, No. 4, Apr. 1995, pp. 265-266.

*Primary Examiner*—Thomas G. Black
*Assistant Examiner*—Jean M. Corrielus
*Attorney, Agent, or Firm*—Floyd A. Gonzalez

[57] ABSTRACT

A method and program for use with a massively parallel processor (MPP) system or a distributed computer system for providing a physical design layout database across several nodes of the system. A user inputs a first datafile representing the physical configuration of the distributed processor system, and inputs a second datafile representing application tablespaces and/or database system files to be stored in the distributed processor system. The program optionally assigns the tablespaces in the second datafile to the physical configuration of the distributed processor system as specified in the first datafile and per the number of nodes, number of disks per node, and the size of the disks. The user may optionally use the physical design layout of the program, may change a portion of the intermediate physical design layout, or may provide the entire physical database design layout, as desired. The program generates a logical volume map for the tablespaces distributed over the distributed processor system, and further generates scripts to implement the tablespace structure into a physical database.

30 Claims, 9 Drawing Sheets

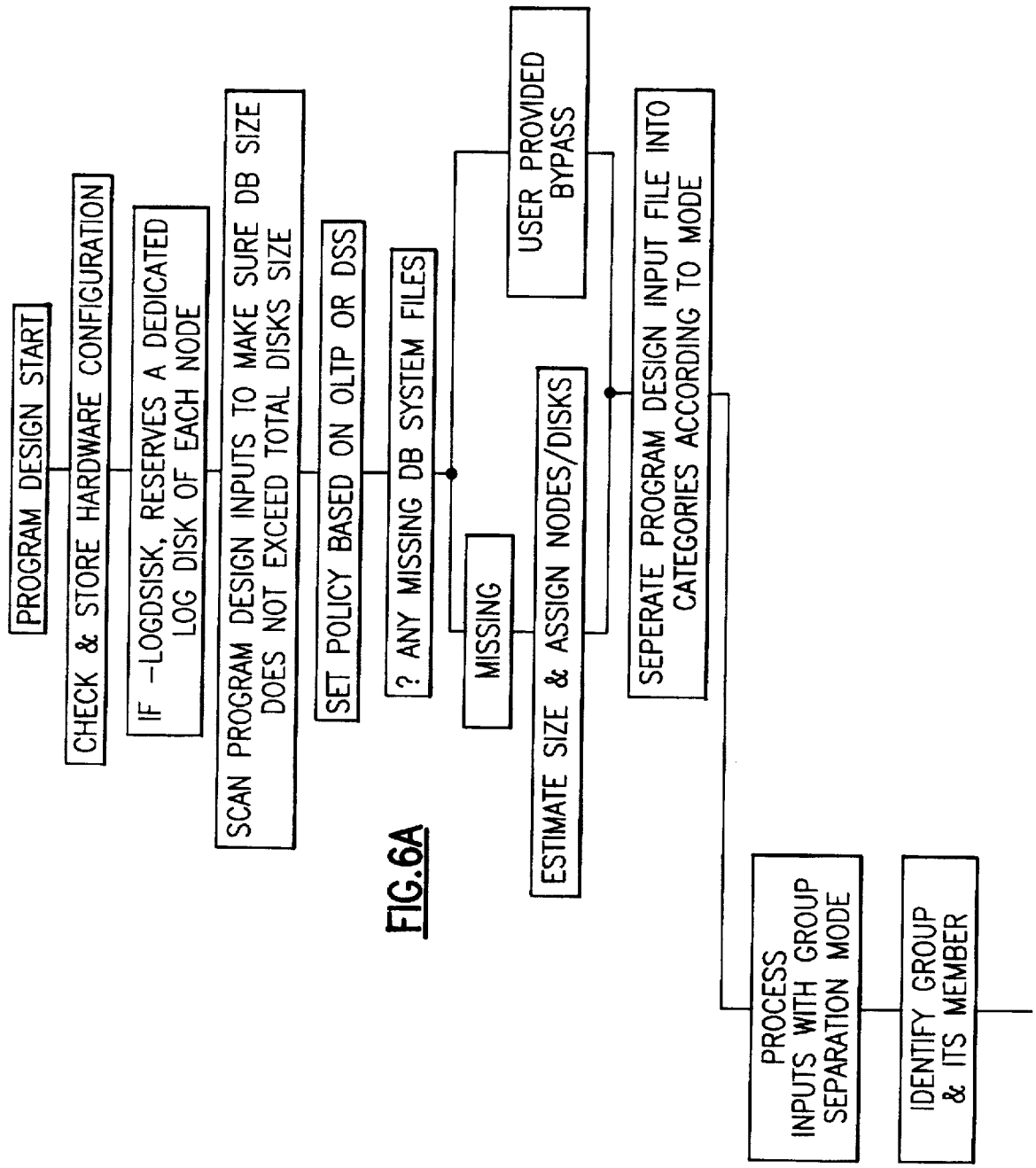

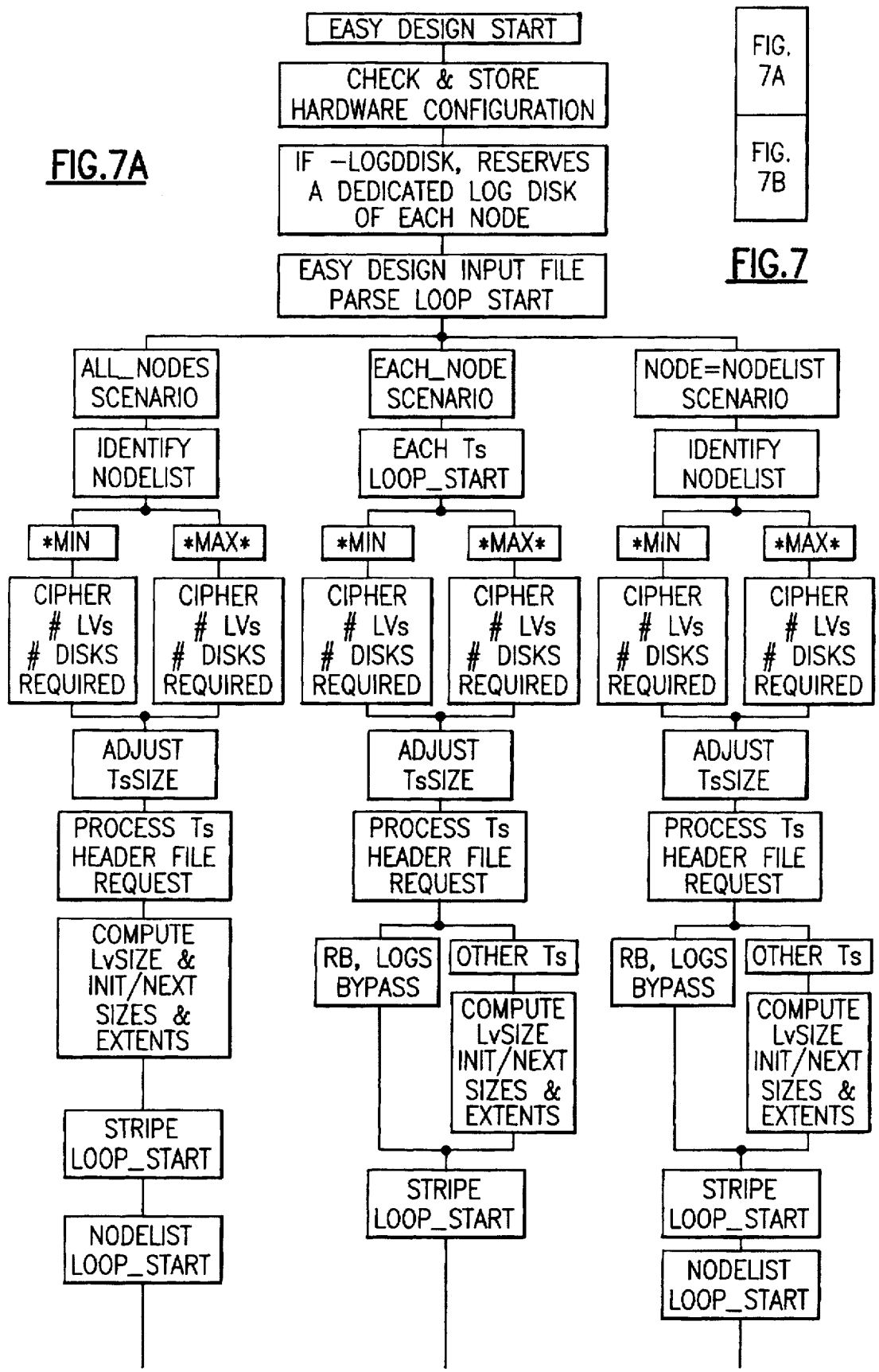

PROGRAM AND METHOD FOR ESTABLISHING A PHYSICAL DATABASE LAYOUT ON A DISTRIBUTED PROCESSOR SYSTEM

BACKGROUND OF THE INVENTION

The present invention is related to implementing a database on a data processing system, and is more particularly related to implementing a physical database from a logical design across several nodes of a distributed processor system. The invention is implemented by a program in which a user may specify parameters to make the implementation method fully manual, partly automated or fully automated, as desired.

Many applications making use of databases are well known. In these applications, several datafiles which are interrelated are established. The interrelation-ships are set out in tables, such that many different pieces of information can be kept in different datafiles, but all the information can be assembled by moving from file to file, as is well known. One such database application is the ORACLE7 Parallel Server application available from Oracle Corporation of Redwood Shores, Calif.

As the number of datafiles and tables increase, the design of the physical database structure becomes more complicated. The design and implementation of a physical database layout is more complicated when a parallel processor system or loosely coupled massively parallel processor (MPP) system is used in which the database may be spread over multiple nodes of the system.

U.S. Pat. No. 5,237,691 issued Aug. 17, 1993 to Robinson et al. for METHOD AND APPARATUS FOR AUTOMATICALLY GENERATING PARALLEL PROGRAMS FROM USER-SPECIFIED BLOCK DIAGRAMS discloses apparatus and method for automatically generating computer programs for using parallel processor arrangements from a user generated block diagram of the program.

U.S. Pat. No. 5,249,270 issued Sep. 28, 1993 to Stewart et al. for DEVELOPMENT SYSTEM PROTOCOL discloses an integrated set of hardware and software tools for rapid design, programming, debugging, implementation, and testing of local operation network nodes.

U.S. Pat. No. 5,216,592 issued Jun. 1, 1993 to Mann et al. for SYSTEM AND METHOD FOR BUSINESS PROCESS AUTOMATION discloses a system and method for developing specialized data processing systems for tracking items through a business process. The disclosed method allows rapid creation of a specific data processing system based upon a series of generic process rules previously developed and stored in the system.

AUTOMATING DATABASE IMPLEMENTATION, IBM Technical Disclosure Bulletin Vol. 38 No. 04 (April, 1995) discloses a program for automating the implementation of an Oracle Parallel Server (OPS) database on an IBM Scalable POWERparallel Systems SP2 computer system. The hardware platform is internalized by the disclosed program as a single large computer with multiple disk drives, disk attachments, and network connections. The database objects are internalized as discrete objects belonging to specific storage classes, and their sizes are calculated using formula defined in the OPS documentation. The disk requirements for each database object is calculated, and each object class is mapped to the hardware platform's disk subsystems using information supplied by the implementer, and the algorithms which mimic the parallel process assignment of OPS. The program then generates AIX operating system and Virtual Shared Disk (VSD) command files which format and implement the disk subsystems. The OPS commands required to create and implement the database are written on a per-object-class basis to OPS command files. Lastly, an analysis of the resultant database system and its' implementation is generated for review by the implementer.

SUMMARY OF THE INVENTION

The present invention is for use with a massively parallel processor (MPP) system or a distributed system such as the IBM Scalable POWERparallel Systems (SP) computer system and can be used to design an implementation of a database such as the ORACLE7 Parallel Server application across several nodes of the system. A user inputs a first datafile representing the physical configuration of the distributed processor system, and includes the number of nodes available in the distributed processor system, the number of disks per available node, and the size of each of the disks in the distributed processor system. The user inputs a second datafile representing application tablespaces and/or database system files to be stored in the distributed processor system. The second datafile includes a name, size and mode of each tablespace in the second datafile. The program may optionally assign the tablespaces in the second datafile to the physical configuration of the distributed processor system as specified in the first datafile and per the number of nodes, number of disks per node, and the size of the disks. The user may optionally use the physical design layout of the program, may change a portion of the intermediate physical design layout, or may provide the entire physical database design layout, as desired. The program generates a logical volume map for the tablespaces distributed over the distributed processor system, and further generates scripts to implement the tablespace structure into a physical database. Thus, the user may allow the program to fully design the physical database layout, or may fully design the physical database layout without the use of the program design, or may use any portion of the program designed physical database layout and design the remainder of the physical database layout, as desired.

It is a primary object of the present invention to provide a program and method to design a physical database layout for use with a distributed, parallel processor system in which the physical database layout of the program and method may be altered by a user, as desired.

It is a further object of the present invention to provide a program and method for designing a physical database layout wherein the physical database layout can be completely designed by the program and method, a portion of the physical database layout is designed by the program and method with a portion designed by the user, or the user may design the entire physical database layout, as desired.

It is a further object of the present invention to provide a program and method having cascaded design stages with a minimum of user inputs, wherein the design evolves from high level to full scale, and in which a user can overwrite the intermediate design to customize the database, as desired.

It is a further object of the present invention to provide a program and method having a high level database language which provides easy datafile groupings of data objects and system files and provides a simple mechanism for spreading data objects across nodes and disks of the distributed, parallel processor system.

It is a further object of the present invention to provide a program and method which is portable among different database vendors in which the program and method features a top down design in which datafile groupings are common to all, and a bottom up implementation in which the group interpretation is vendor specific.

The foregoing and other objects, features and advantages of the invention will be apparent from the following more particular description of the preferred embodiment of the invention as illustrated in the drawings.

BRIEF DESCRIPTION OF THE DRAWINGS

FIGS. 6, 6A–6B, when taken together as shown in FIG. 6, is a flowchart of a PROGRAM DESIGN phase portion of the program of FIGS. 3 and 4;

FIGS. 7, 7A–7B, when taken together as shown in FIG. 7, is a flowchart of an EASY DESIGN phase portion of the program of FIGS. 3 and 4.

DESCRIPTION OF THE PREFERRED EMBODIMENT

Figure 1:
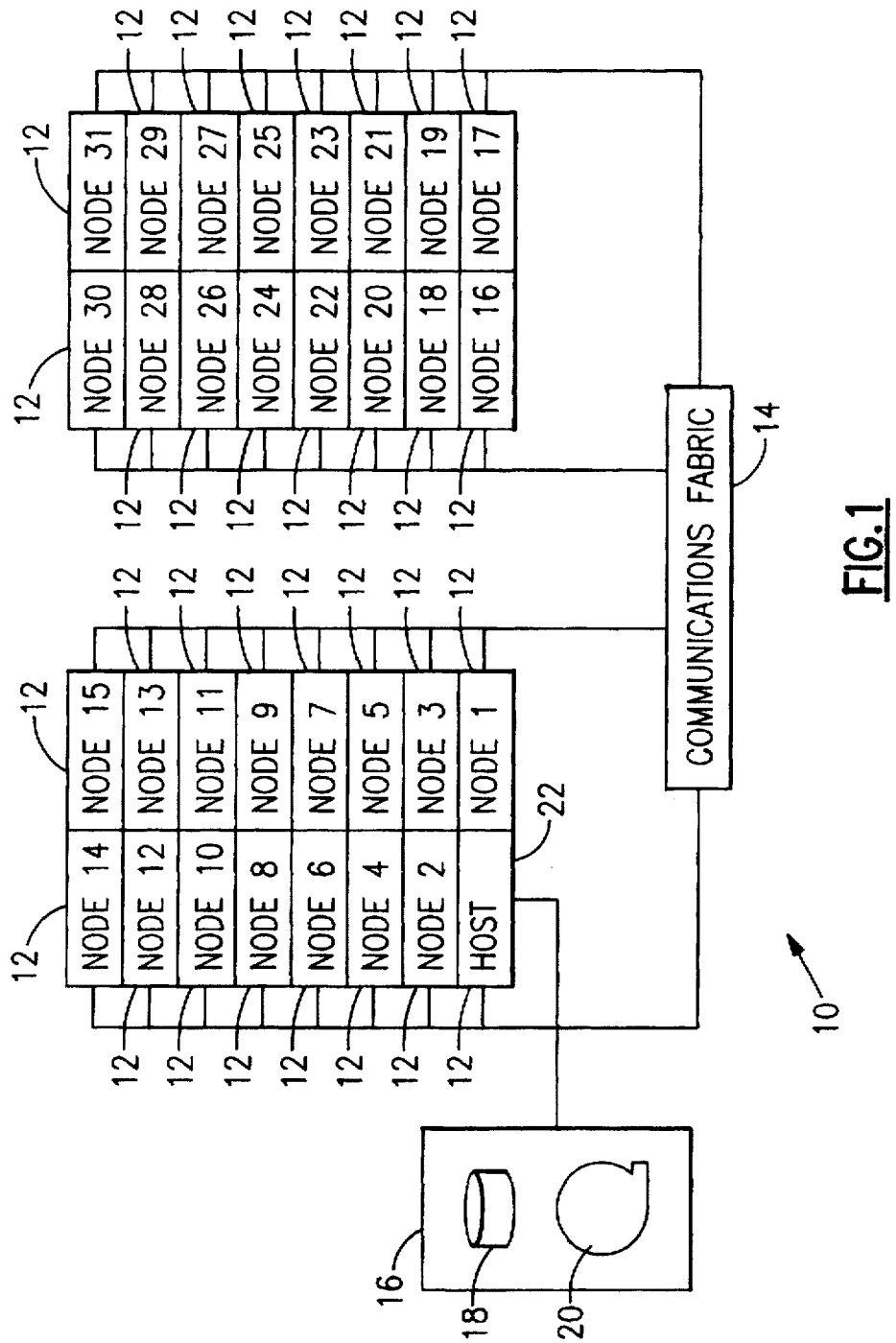
FIG. 1 is a schematic diagram of a distributed processor system usable with the present invention.

FIG. 1 is a schematic diagram of the IBM Scalable POWERparallel Systems SP parallel processor system that is usable with the program and method of the present invention. The system 10 includes multiple nodes 12, each of which are connected to a communication fabric 14. The communication fabric 14 may be a local area network (LAN) or a high speed switch, which is well known, for communicating messages between the nodes 12. The messages may be commands or data, as is well known. Each node 14 includes a memory 16 which may include direct access storage devices (DASD) 18 as well as tape storage 20. The DASD 18, shown as a single symbol in FIG. 1, may actually contain multiple disks, as is known. One of the nodes 12 is typically designated as the host node 22, and the remainder of the nodes 12 are designated as the server nodes. Each of the nodes 12 has its own operating system. In the case of the IBM SP system, each node 12 includes the IBM AIX operating system, which is the IBM version of the UNIX operating system. It will be understood that the present invention may also be used with a loosely coupled MPP system.

Figure 2:
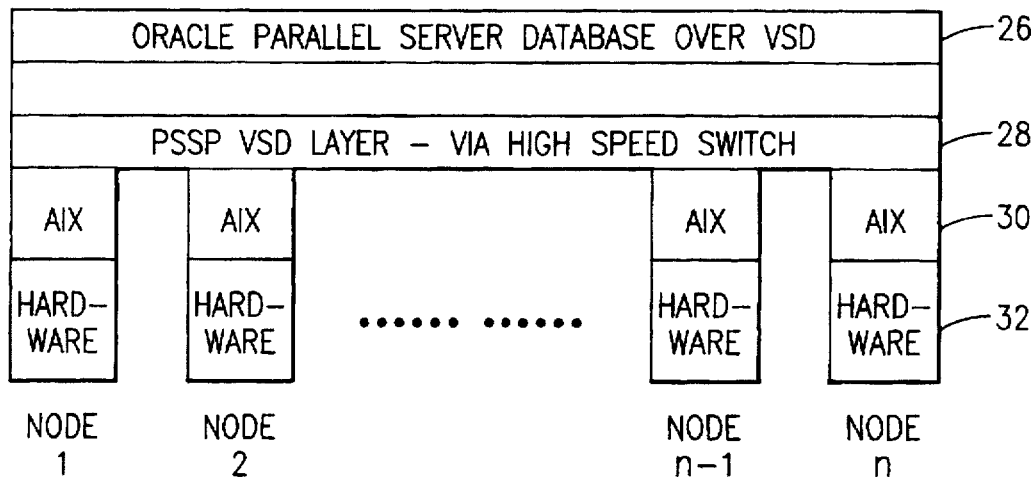
FIG. 2 is a block diagram representing the software layers overlaying the hardware platform of FIG. 1.

FIG. 2 is a block diagram representing the layers of the applications and operating systems of the hardware platform of FIG. 1. The layer 26 is the database application layer. In the preferred embodiment, the layer 26 is the Oracle Parallel Server Database application. This layer is over the IBM Parallel System Support Programs (PSSP) layer 28 which includes the Virtual Shared Disk (VSD) layer for controlling the individual disks of the nodes 12 via the high speed switch of the communication fabric 14. It will be understood that the PSSP software is an IBM product the provides for support of the IBM Scalable POWERparallel Systems SP computer system. VSD is one of the IBM programs in the PSSP software, and provides a facility which allows application programs executing on different nodes to access a logical volume as if it were local to each of the nodes. The PSSP layer 28 is over the AIX operating system layer 30, which is over the hardware layer 32 of the nodes 1 through n. It will be seen that the layers 26 and 28 are shown as single layers covering the individual nodes, whereas the AIX layer 30 is shown as individual operating systems over the individual node hardware of the hardware layer 32.

The IBM Scalable POWERparallel Systems SP computer system of FIG. 1 has a architecture to allow multiple nodes to share access to data via the VSD facility over a high performance switch of the communication fabric 14. The SP architected features allow the Oracle Parallel Server application to be enabled over the SP Computer system by running multiple Oracle instances that share a single physical database. In the present ORACLE7 application, this single physical database can have as many as 1022 datafiles. It is expected that the number of datafiles will become even larger as the demand for larger databases grows in the commercial market.

As will be explained, the present invention provides a flexible, three level cascade design which accommodates most of the database design and skill requirements needed to establish a database. The present invention also provides a simple methodology to map both Oracle system files and application tablespace onto the nodes 12. The mapping mechanism is a list structure which enables a designer to map logical database requirements into physical resources without spelling out the details. The present invention provides a complete database implementation package generated from the database design. As explained in connection with FIG. 2, the implementation package covers the AIX operating system layer 30, the PSSP VSD layer 28 and the Oracle layer 26.

Figure 3:
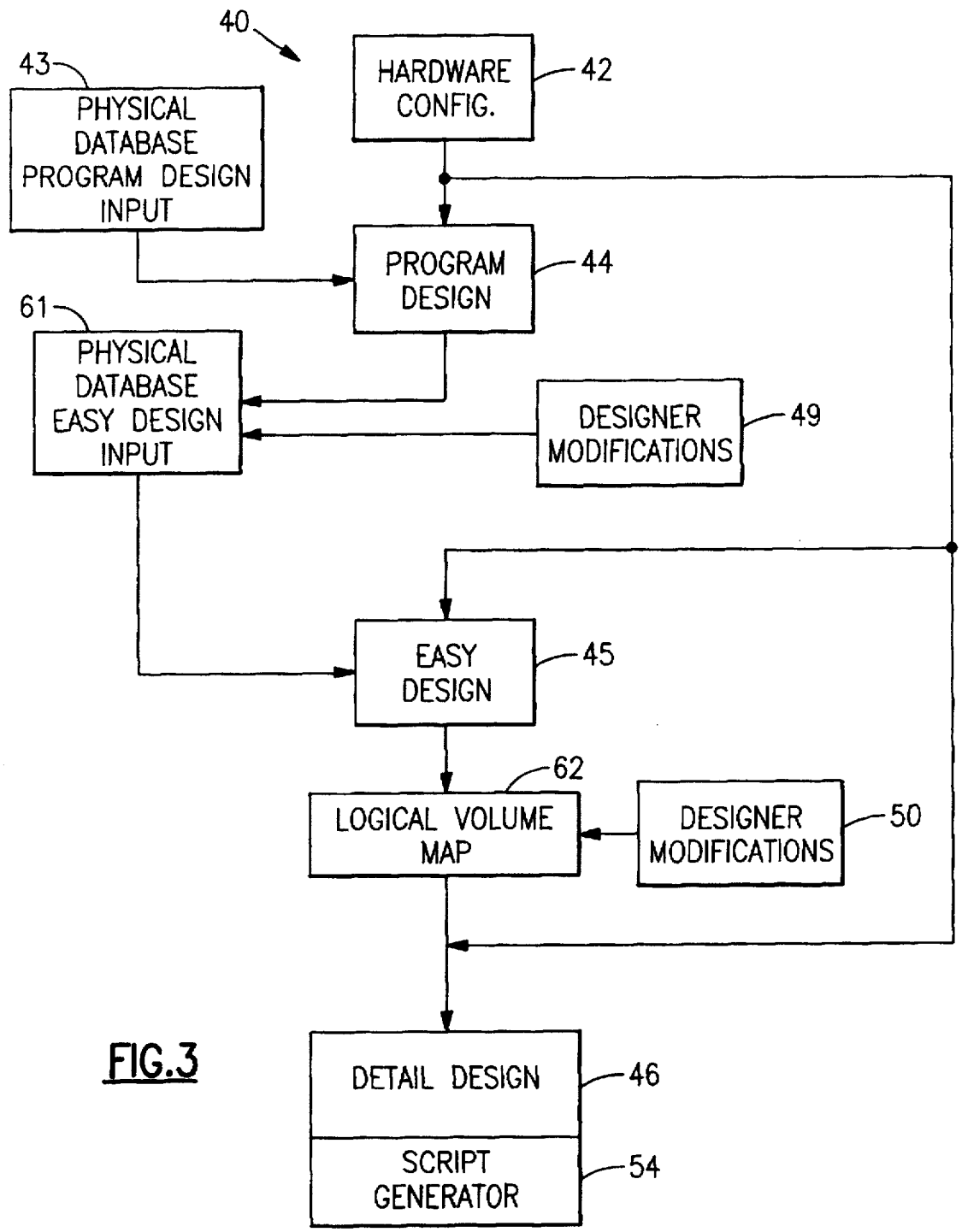
FIG. 3 is a diagram of a computer program for implementing a database on the distributed processor system of FIG. 1.

FIG. 3 is a diagram of the computer program 40 of the present invention which has a three level design, to be explained. The program 40 is driven by two input files. The first file 42 is the hardware configuration file which specifies all the physical resource limitations of the platform. The configuration file includes a list of each node's memory size, disk names and capacities, volume group name and physical partition size, hostname and high speed switch ip address and, optionally, a backup node for each node. The second file 43 is a file which describes the physical database design specific at that design level. The program 40 includes a PROGRAM DESIGN phase 44, an EASY DESIGN phase 45, and a DETAIL DESIGN phase 46. The three level design allows the database design to evolve from a simple high level design into a complete customized database as the process progresses from PROGRAM DESIGN, to EASY DESIGN, and then to DETAIL DESIGN. The database design for application tablespaces is achieved by characterizing the database detail through a combination of keyword like attributes.

The cascade program 40 provides that database designs are performed in a top down fashion wherein a high level design phase drives a low level design phase. The PROGRAM DESIGN phase 44 drives the EASY DESIGN phase 45, which in turn drives the DETAIL DESIGN phase 46. At 49 and 50, the designer may chose to modify the intermediate physical database design in order to customize his database. Modifications 49 and 50 allows a designer to inject modifications at any level to modify program supplied designs, as desired. An experienced designer might choose to design a database starting at the EASY DESIGN phase 45 because this gives explicit database design controls, whereas a novice designer may choose to start at the PROGRAM DESIGN phase 44 because only minimum inputs are required.

To start the PROGRAM DESIGN phase 44, the physical database PROGRAM DESIGN input 43 includes the database name, the database nature (OLTP or DSS) and the name, size and mode of each application tablespace. The PROGRAM DESIGN phase 44 provides the best fit of the given tablespace size by selecting the datafile allocation strategy and the nodes with I/O balancing in mind. in addition, the PROGRAM DESIGN phase 44 also detects and makes provisions for any missing database system files, such as system tablespace, private rollback tablespaces, private redo logs and control files. Depending on the input request at 43, the PROGRAM DESIGN phase 44 supports datafiles distribution in a round robin fashion or range partition fashion. The PROGRAM DESIGN phase 44 also has the ability to separate groups of tablespaces to different disks, if desired. The end results produced by the PROGRAM DESIGN phase 44 is an intermediate file 61 which includes a high level description of a complete application database with application specific attributes.

The EASY DESIGN phase 45 may be either a continuation of the PROGRAM DESIGN phase 44, or it may be a separate design, depending on the source of the EASY DESIGN input 61. If desired, the EASY DESIGN input file 61 may be the results of the PROGRAM DESIGN phase 44. If the EASY DESIGN phase 45 is entered directly, the user provides the input file 61 to include a complete database description using the tablespace attributes to be described which are entered directly into the datafile 61 at 49. The EASY DESIGN phase 45 checks the user inputs syntax and stops the design of the database if any error is encountered.

The EASY DESIGN phase 45 implements each tablespace of the given nodes 12 by assigning disk space (logical volumes or datafiles). It is important to note that the EASY DESIGN phase 45 does not require all of the I/O configurations of the nodes 12 to be the same. For example, the EASY DESIGN phase 45 allows each node 12 to have different numbers of disks, different size disks, and even different volume group physical partition sizes. All disks within a node 12 are assigned by the EASY DESIGN phase 45 in a round robin fashion. The results of the EASY DESIGN phase 45 is a logical volume map 62 which describes the name and size of all logical volumes, and the node 12, volume group and disk(s) each logical volume is allocated to.

The tablespace order listed in the input file 43 is treated by the program 40 as a descending order of the I/O performance importance. For example, the first tablespace listed in the input file 43 will be considered by the program 40 as the most important tablespace of the entire database. All AIX Commands generated by the program 40 to allocate tablespace datafiles use the typical disk center allocation policy. Datafiles allocated at the disk center are assumed to give the best I/O performance. Nevertheless, the disk center space is very limited. On a first-come-first-served basis, only the first few most important logical volumes can be allocated to the disk center. Once the space at the disk center is filled, all the rest of the datafiles allocation will automatically spill into the disk middle region and the disk edge region. Therefore, a different order of tablespace listings does lead to different physical database implementations. Also, within each tablespace, the designer specified node order is very important. The node order given will be used by the program 40 to determine the order that will be followed in distribution, the logical volume of that tablespace to the nodes, referred to as the traversing order.

The DETAIL DESIGN phase 46 includes a script generator 54 which generates all the SQL scripts and the AIX Commands files required to build the database. The scripts cover the AIX layer 30, the PSSP layer 28 and the Oracle or other database application layer 26. The execution of these scripts produces an Oracle database ready for dataload.

The program 40 does allow the designer to directly enter the DETAIL DESIGN phase 46. In that case, the mentioned logical volume map 62 is entered at 50 by the designed. It will be understood that such a direct use of the DETAIL DESIGN phase 46 is very tedious, but provides the designer with complete control over the design of the database.

The program 40 allows a designer to design a database by assembling tablespaces in steps. This allows the designer to complete the design in a discrete fashion and refine the database design in a stepwise process. This is facilitated by use of a disk space tracking tool which tracks the disk capacity, disk space allocated and disk space available at every node in the configuration file (shown as 100 of FIGS. 4 and 7B), and by a high level language which enables the database designer to express a database in terms of tablespace groups, to be explained.

Figure 4:
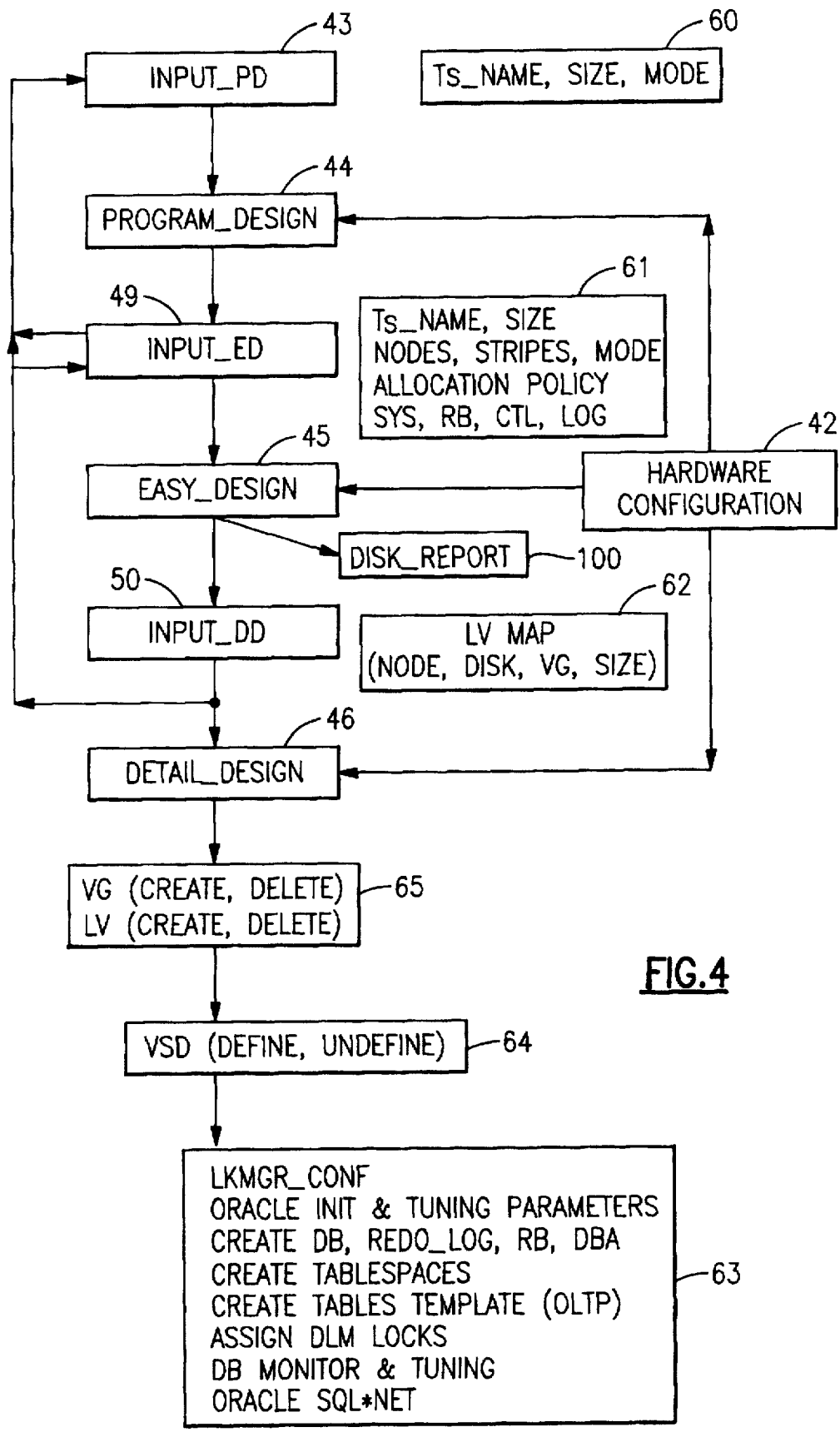
FIG. 4 is a more detailed block diagram of the program of FIG. 3.

FIG. 4 is a more detailed block diagram of the program 40 of the present invention. The reference numbers of FIG. 4 are the same as those used in FIG. 3. The input to the PROGRAM DESIGN phase 44 is shown at 60, the input to the EASY DESIGN phase 45 (either from the PROGRAM DESIGN phase 44, or entirely from the designer, or some combination of the two) is shown at 61, and the input to the DETAIL DESIGN phase 46 (either from the EASY DESIGN phase 45, or entirely from the designer, or some combination of the two) is shown at 62. The scripts generated by the DETAIL DESIGN phase 46 is shown at 63, 64 and 65. Scripts for the Oracle layer 26 are generated at 63 in the order shown. VSD commands files are generated at 64 for the PSSP layer 28 and volume group (VG) and logical volume (LV) commands files are generated at 65 for the AIX layer 30 to implement the database design.

The output of the database design is a collection of SQL scripts, AIX command files and utilities which reflects the designed database. The execution of these scripts is an Oracle database ready for dataload. All scripts, SQL or AIX command scripts, are designed with parallel in mind. For example, at the AIX level, each node has its own volume group creation script and logical volume creation script which enables the parallel creation of the volume group or logical volumes of each node via 'dsh' (distributed shell, PSSP feature). Also, at the Oracle level, all datafiles are added to a tablespace in parallel fashion after the tablespace is created using the very first datafile. All the parallel creation required AIX command shell scripts are included. The following shows the command scripts in the order generated:

AIX Layer:
(a) Nodelist for dsh.
(b) rhosts for rsh.
(c) user profile.
(d) Parallel create/delete Volume Group (VG) of each node.
(e) Parallel create/delete Logical Volume (LV) of each node.

PSSP Layer:
(f) VSD (Virtual Shared Disk) command scripts to define/ delete VSD nodes, volume groups and devices.

RVSD (Recoverable VSD) scripts to delete primary nodes and backup nodes.

HSD (Virtual Shared Disk data striping devices) scripts to define/delete striping VSD if requested.

Oracle Layer:

(g) Lock manager (lkmgr)

lkmgr configuration file.

lkstart parameters (-l -r -p) recommendations for database creation phase.

lkstart parameters (-l -r -p) recommendations for production.

(h) Oracle initialization and tuning parameters.

one initial per Oracle instance (or node), the MTS (Multi-Threaded Servers) related initial are also included.

one common file for the shared initial. This file includes most of the initial Oracle tuning settings recommendations, e.g. db_block_buffers, log_buffer, gc_db_locks, gc_files_to_locks . . .

(i) SQL scripts to create database, redo logs, rollback tablespace and rollback segments, and one database administrator account in additional to Oracle provided accounts 'sys' and 'system'.

(j) For each application tablespace creation, SQL & AIX command scripts are provided. The datafiles of the application tablespace are altered into the tablespace in parallel.

(k) SQL scripts to pre_allocate table extents for tables using freelist groups and freelists. This is frequently used in the OLTP environment to logically partition table data among different Oracle instances.

(l) Database monitor SQL scripts:

bstat_estat, one set of bstat and estat for each node, which summarizes the database characteristics between the beginning statistics and ending statistics.

Oracle dynamic performance table query, the v$ tables, one for each node.

(m) SQL*Net scripts.

listener.ora, one for each node.

tnsnames.ora: include all the client services for both dedicated servers and multi-threaded servers.

The high level language which enables a database designer to express a database in terms of tablespace groups will now be discussed. Each tablespace group is characterized by some tokens which not only dictate the sizes and locations of all associated datafiles, the tablespace group also determines the order of the datafiles to be used by the tablespace. The basic elements of a tablespace construction consists of the following:

(A) Logical Volume Allocation Policy, (B) Operator, (C) Stripes, (D) Tablespace Mode, and (E) Initial/Next Extents.

Figure 5:
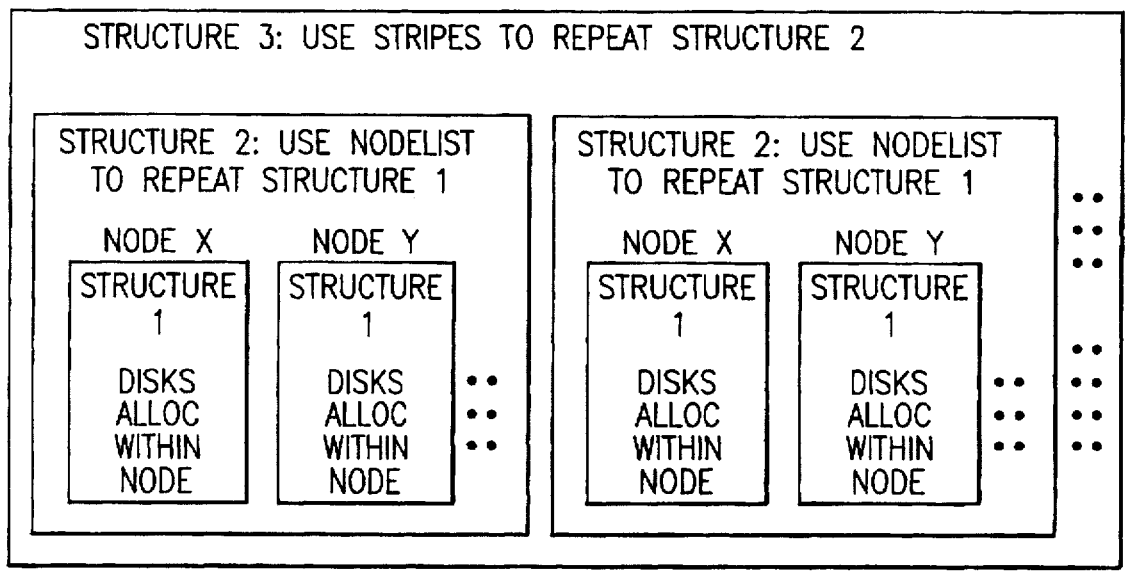
FIG. 5 is a representation of the first three elements of a tablespace construction used by a portion of the program of FIG. 3 and 4.

FIG. 5 is a representation of the first three elements of the tablespace construction. The innermost structure, structure 1, represents the Logical Volume Allocation Policy, which determines how disks are allocated to logical volume(s) within a node 12. The Logical Volume Allocation Policy supports allocation of either a horizontal fragmented logical volume (a logical volume spread across disks) or vertical fragmented logical volumes (every logical volume stays in a disk) within a node 12.

Structure 2 of FIG. 5 represents the Operator element which guides the execution of the structure 1 Logical Volume Allocation Policy through a given nodelist. Structure 3 represents the Stripes element which is a repetition factor. Stripes dictates how many times structures 1 and 2 are repeated. A Stripes number greater than one implies finer horizontal fragmentation across the participating nodes.

A tablespace can have three levels of striping. The first level of striping is at the datafile level. This represents how a datafile (logical volume) can be stretched across the available disks within a node. The first level is implemented by the Logical Volume Allocation Policy. The second level of striping is at the nodes level, that is, datafiles of a tablespace can be striped across the selected nodelist. The third level of striping is the repeating factor Stripes, which repeats the first and second level of striping with the specified number of times.

The Tablespace Mode specifies the nature of a tablespace. For example, Tablespace Mode specifies whether the tablespace is read based or write based, whether all datafiles associated with this tablespace should be allocated in a round robin fashion or in a range partition fashion.

The Initial/Next Extent elements may be used to specify the size of the initial and next extent of each tablespace, as will be explained.

Each of these elements will now be discussed:

(A) Operator.

There are three operators supported by the program 40:

all-nodes, each_node, and node=node_list.

'All_nodes' means that all nodes listed in the configuration file 42 will participate to create a tablespace. 'Each_node' indicates that each node will create its own individual tablespace or the required system files. 'Node=node_list' signifies that only the nodes selected in the node_list will participate in creating a tablespace. The three operators will now be discussed:

(a) all_nodes

'All_nodes' uses all the nodes listed in the configuration file 42. 'All_nodes' when in use with a tablespace indicates that all datafiles associates with that tablespace are evenly spread across all the nodes. The order of the associated datafile(s) on each node will be added into the tablespace according to the nodes order listed in the configuration file 42. 'All_nodes' is normally used with a very large size tablespace. All datafiles are spread out in round robin fashion across all the nodes in the order listed in the configuration file 42.

EXAMPLE 1

A tablespace LARGE, 3200 MB, all_nodes Interpretation: a tablespace LARGE with 3200 MB in size is spread across all nodes listed in the configuration file 42. For instance, if there is only one stripe and there are 16 nodes in the hardware configuration file 42, then there are 16 logical volumes associated with the tablespace LARGE, there will be one logical volume per node, each 200 MB in size.

(b) each_node

'Each_node,' when in use with a tablespace, indicates that every node listed in the configuration file 42 has its own unique tablespace. The tablespace name of each node is composed of two parts: the user provided tablespace name followed by the node number. This feature is designed to handle private files of each database instance (or node), e.g., private redo logs (Example 2) or private rollback tablespaces (Example 3). It is also very useful in implementing an application tablespace in either a distributed environment or an OLTP environment. For example, to bypass the Oracle parallel server instance locking in an OLTP environment, one might want to range partition both table and the associated index(es) into different nodes with a unique tablespace name for each (Example 4).

EXAMPLE 2 log1a, 100 MB, each-node
log1b, 100 MB, each_node
log2a, 100 MB, each_node
log2b, 100 MB, each_node Interpretation: Every node (or Oracle instance) has 4 redo logs, 2 groups of logs with 2 members each. Each log is 100 MB in size.

EXAMPLE 3

A tablespace RB, 500 MB, each_node

Interpretation: Every node (or Oracle instance) has a RB (RollBack) tablespace, 500 MB each. For instance, if there are 2 nodes, nodes 21 and 23, listed in the hardware configuration file 42, then the above statement allocates a tablespace RB21 on node 21, and another tablespace RB23 on node 23. Each tablespace is 500 MB in size.

EXAMPLE 4

TEST, 500 MB, each_node, (intended for data)
TESTIDX, 100 MB, each_node, (intended for index)

Interpretation: If there are 2 nodes, nodes 21 and 23, in the hardware configuration file 42, then the statements above allocate a 500 MB TEST21 tablespace and a 100 MB TESTIDX21 tablespace on node 21. Another 500 MB TEST23 and a 100 MB TESTIDX23 tablespace on node 23 will also be allocated.

(c) node=node_list

'Node=node_list' is a way for the user to select a subset of nodes from the configuration file 42 to be used with a tablespace. It is important to note that the order of the implementation of tablespace creation. The same order will be used by the program 40 to add (or alter) datafiles into the associated tablespace.

EXAMPLE 5

A tablespace SMALL, 224 MB, node=8,5

Interpretation: a tablespace SMALL which is 224 MB in size is spread across two nodes, 8 and 5. If stripe=1, the above statement means that there are 2 logical volumes associated with the tablespace SMALL. The first logical volume is on node 8, and the second logical volume is on node 5. Each logical volume is 112 MB is size.

(B) Stripes

This feature is designated to stripe a very large size tablespace by evenly spreading out data in datafiles over the associated nodes. Specifying any stripe number greater than 1 has two implications. The first is that there is more than one logical volume, equal in size, in each node. The second is that all datafiles will be added to the created tablespace by using all the associated nodes in a round robin fashion. Striping is performed with I/O balancing in mind. Under normal conditions, the stripe should be set at 1 which means there is only one datafile (logical volume LV) per node for the associated tablespace. All datafiles will be added to the tablespace according to the associated nodelist.

EXAMPLE 6

A tablespace DEPT, 224 MB, node=5,8, stripes=1.
The resulting logical volumes (LVs) are as follows:

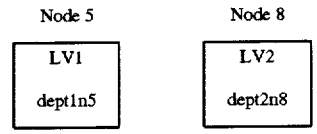

Representation: two Logical Volumes (LVs), dept1n5 and dept2n8 are created for tablespace DEPT. Both LVs are equal in size, 112 MB each. The first LV is allocated on node 5 and the second one on node 8. The datafiles are added to the tablespace DEPT in the order of dept1n5; dept2n8.

The logical volume names are automatically generated by the program 40. The logical volume naming nomenclature is chosen mainly for easy identification either by the AIX operating system administrator or the ORACLE database administrator. Each name is composed of three parts, the first part is the tablespace name, the second part is the stripe number, and the third part is the node number.

EXAMPLE 7

A tablespace DEPT, 224 MB, node=5,8, stripes=2.
The resulting logical volumes are as follows:

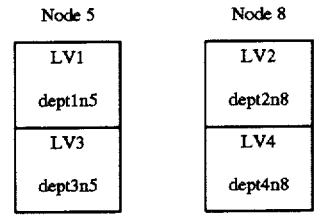

Representation: 4 logical volumes (LVs) are created for tablespace DEPT. All 4 LVs are equal in size, 56 MB each. LV1 and LV3 are allocated on node 5. LV2 and LV4 are allocated on node 8. The datafiles are added to the tablespace DEPT in the order of dept1n5; dept2n8; dept3n5; dept4n8.

(C) Logical Volume Allocation (LVM) Policy.

There are two logical volume allocation categories, 'MIN' or 'MAX'. 'MIN' is the logical volume minimum allocation policy which indicates that one disk (or physical volume) should contain all the physical partitions of this logical volume (LV). 'MAX' is the logical volume maximum allocation policy which indicates that as many disks (or physical volumes) as possible should be used to allocate this LV. 'MAX' implies that if a logical volume has enough PPs (Physical Partitions), all disks available in the volume group are used for the logical volume allocation.

'MAX' can be regarded as a way to spread a logical volume across all available disks into many horizontal fragments. This horizontal fragmentation of a LV at Logical Volume Manager (LVM) level should not be confused with the datafiles striping across all nodes, which is the second level striping above the 'logical volume striping among disks'. 'MIN' should be considered as a way to do vertical fragmentation since every logical volume allocation is expected to be contained within a disk.

To further enhance the disk fragmentation, flexibility of the logical volume allocation, some variations of 'MIN' or 'MAX' allocation policies are provided. These features are summarized in Table 1, Allocation Policy Syntax Diagram and Table 2, All Supported Allocation Policies.

TABLE 1

Allocation Policy Syntax Diagram

| Syntax | Number of LVs | Allocation | Number of disks |
|---|---|---|---|
| MAX | (all | n | null) | MAX | 1 |
| | | MAX | (n) |
| MIN | (all | n | null) | MIN | |

TABLE 2

All Supported Allocation Policies

```
allMAX1   nMAX1   MAX1   MAXn   MAX
  ||       ||      ||
allMIN    nMIN    MIN
``` where
- 'MAX': allocates a logical volume using maximum allocation policy across all available disks of a volume group in a node
- 'MAXn': allocates a logical volume using maximum allocation policy across n disks of a Volume Group in a node. $1<=n<=$available disks of a volume group in a node.
- 'MIN' or 'MAX1': allocates a logical volume using minimum allocation policy in a disk of a volume group in a node.
- 'nMIN' or 'nMAX1': allocates n logical volumes within a node using minimum allocation policy, one logical volume per disk, $1<=n<=$available disks of a volume group in a node.
- 'allMIN' or 'allMAX1': allocates logical volumes using minimum allocation policy on all available disks of a volume group in a node, one logical volume per disk.

Although '*MAX1' and '*MIN' appear to be different, nevertheless, they render the same logical volume allocation policy. This provides for the support of multiple versions of the allocation policy for the support of different implementations. In the actual implementation phase, '*min' will be interpreted as range partition. However, '*max1' will be interpreted as HSD (Virtual Shared Disk data striping devices) if an HSD_OPTION is turned on in a customization environmental variable file.

The above syntax provides that logical volume(s) allocation within a node is limited by the maximum number of disks available in that node. For example, if a node has only 4 database disks, the permissible maximum policy logical volume allocations are 'MAX4' (or 'MAX'), '*MAX3', 'MAX2' and 'MAX1', in other words, a horizontal fragmented logical volume can stretch out to at most 4 disks which is 'MAX4'. On the other hand, only 'allMIN'= ('4MIN1'), '3MIN1', '2MIN1' and '1MIN' (='MIN') are legitimate minimum policy allocation cases. That is, since each disk can only accommodate one minimum policy allocated logical volume and there are only 4 disks, at most 4 minimum policy logical volumes can be allocated, which is '4MIN'. Every 'MIN' logical volume is on a different disk.

'MAX' (Maximum) logical volume allocation policy, if used with 'all_nodes,' is a very powerful combination which indicates that the associated tablespace should be allocated across all nodes and all disks within each node.

For example, a logical volume of 24 MB (6 PPs with 4 MB PP size) is allocated with 'MAX' LVM allocation policy over a 3 disk volume group, the PPs allocation are as follows:

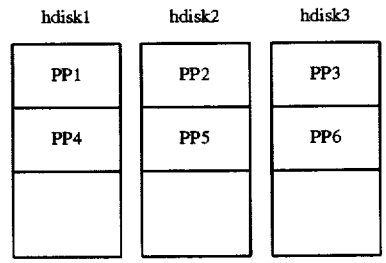

'MAXn' is a subset option of the 'MAX'. 'MAXn' (e.g. MAX2) states that LVM maximum allocation policy will only be applied to the number of disks specified. For example, a logical volume of 24 MB (6 PPs with 4 MB PP size) is allocated with 'MAX2' LVM allocation policy over a 3 disks volume group, the PPs allocation are as follows:

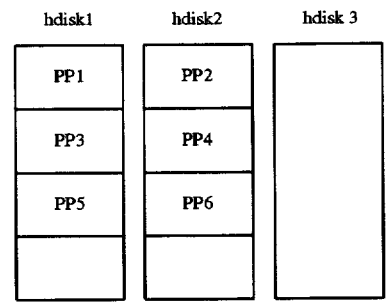

'MAXn' is particularly useful in separating table from its index(es). For example, using the same disk configuration above, one can use 'MAX2' to allocate a logical volume by carving 2 out of 3 disks for table data and a 'MAX1' to allocate a logical volume in disk 3 for an index.

EXAMPLE 8

A tablespace DEPT, 224 MB, node=5,8, stripes=2, 'MIN' (minimum) logical volume allocation policy. Assume each node has 2 disks, node 5 has hdisk1 and hdisk3, node 8 has hdisk2 and hdisk4.

The resulting logical volumes are be as follows:

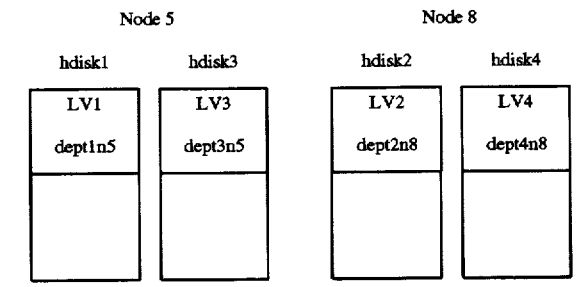

Representation
4 Logical Volumes (LVs) are created for tablespace DEPT. All 4 LVs are equal in size, 56 MB each. LV1 and LV3 are allocated on node 5, with LV1 on hdisk1 and LV3 on hdisk3, due to 'MIN' logical volume allocation policy. LV2 and LV4 are allocated on node 8, with LV2 on hdisk2 and LV4 on hdisk4. The datafiles are added to the tablespace DEPT by the order of dept1n5; dept2n8; dept3n5; dept4n8.

EXAMPLE 9

A tablespace DEPT, 224 MB, node=5,8, stripes=1, '2MIN' logical volume allocation policy. Assume each node has 2 disks, node 5 has hdisk1 and hdisk3, node 8 has hdisk2 and hdisk4.

The resulting logical volumes are be as follows:

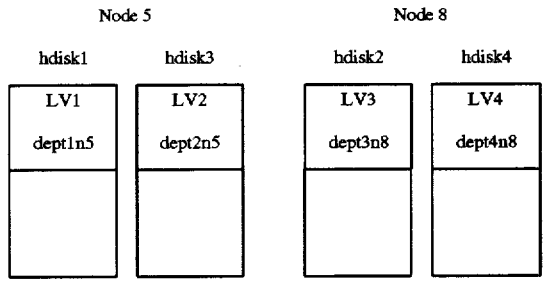

Representation

4 Logical Volumes (LVs) are created for tablespace DEPT. All 4 LVs are equal in size, 56 MB each. LV1 and LV2 are allocated on Node 5, with LV1 on hdisk1 and LV2 on hdisk3, due to '2MIN' allocation policy. LV3 and LV4 are allocated on node 8, with LV3 on hdisk2 and LV4 on hdisk4. The datafiles are added to the tablespace DEPT by the order of dept1n5; dept2n5; dept3n8; dept4n8.

EXAMPLE 10

A tablespace DEPT, 224 MB, node=5,8, stripes=2, 'MAX' (maximum) logical volume allocation policy. Assume each node has 2 disks, node 5 has hdisk1 and hdisk3, node 8 has hdisk2 and hdisk4.

The resulting logical volumes are be as follows:

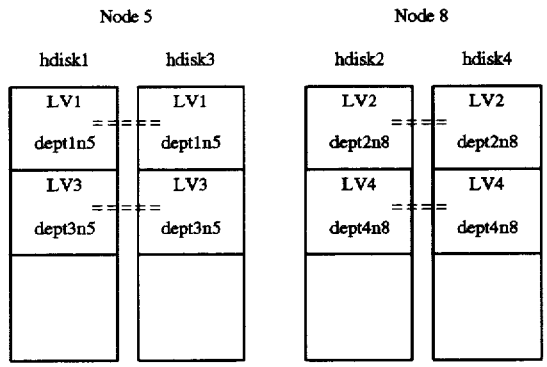

Representation

4 Logical Volumes (LVs) are created for tablespace DEPT. All 4 LVs are equal in size, 56 MB each. LV1 and LV3 are both allocated across hdisk1 and hdisk3 of node 5. Similarly, LV2 and LV4 are both allocated across hdisk2 and hdisk4 of node 8. The datafiles are added to the tablespace DEPT by the order of dept1n5; dept2n8; dept3n5; dept4n8.

EXAMPLE 11 logs request, case 1
log1, 100 MB, each_node, 'MIN'
log2, 100 MB, each_node, 'MIN'

Representation

Every node (or Oracle instance) has 2 redo logs, 2 groups of logs with 1 member each. Each log is 100 MB in size. The default is to allocate each log to a separate disk.

Since the program 40 uses a round robin default to distribute logical volumes onto all disks within a node, it is important to keep log requests together in the input file. To overwrite the default round robin distribution of logs to different disks, one can use PROGRAM DESIGN or EASY DESIGN command line switches -LogSdisk or -LogDdisk. If either switch is specified as a command line option, then all logs of each node are allocated to only 1 disk. The difference between the two switches is -LogDdisk reserves a dedicated disk from each node just for logs while -LogSdisk still allows the rest of the log disk free space to be used by other database space allocation requests.

EXAMPLE 12 logs requests, case 2
log1a, 100 MB, each_node, 'MIN'
log1b, 100 MB, each_node, 'MIN'
log2a, 100 MB, each_node, 'MIN'
log2b, 100 MB, each_node, 'MIN'

Representation

Every node (or Oracle instance) has 4 redo logs, 2 groups of logs with 2 members each. Each log is 100 MB in size and the default is to allocate each log to a separate disk.

Use -LogSdisk or -LogDdisk to stop the round robin log allocation default to different disks. It is safe to use the round robin default to allocate logs on different disks for a DSS database in the case where logging activities are light. However, for a heavy logging OLTP database, it is recommended for all logs to stay in one disk (preferably a dedicated disk, so the disk read/write movement can be reduced to a minimum).

'MAX' allocation policy is recommended to be used with tables frequently requiring full table scans, which implies the data should be evenly spread out among all possible nodes and disk. If the table size is huge, multiple stripes may be used in combination with all_nodes and maximum logical volume policy to further horizontally fragment the table data across all nodes and all disks.

'MIN' or 'nMIN' allocation policy should be used for small size tablespaces (tables), redo logs or applications which requires data to be clearly partitioned among disks. One caveat is that when 'nMIN' is used where n is greater than 1, the Oracle parallel application alters datafiles into a tablespace that can not be used, resulting in the initialization of the full size tablespace possibly taking a much longer time than usual.

(D) Tablespace Mode

Tablespace mode is required as an input parameter for each tablespace. A tablespace mode is composed of three fields, a Read/Write field, a RR/RP field (Round Robin/Range Partition field) and a group separation tag field. Field 1, Read/Write status of a tablespace, is mandatory in both the PROGRAM DESIGN input file and the EASY DESIGN input file. However, both 'RR/RP field' and 'Group separation tag' are only design options reserved for the PROGRAM DESIGN input file, and thus are not mandatory.

'Read/Write status' decides whether the specified tablespace requires any Oracle DLM (Distributed Lock Manager) locks assigned. A Distributed Lock Manager is Oracle software that coordinates resource sharing in the network of nodes running the parallel servers. By definition, only write related tablespaces require the distributed lock manager (DLM) to synchronize accesses from different Oracle instances to its datafiles. If a tablespace contains read only data, data of that tablespace can be shared among many different Oracle instances without contention. Correspondingly, datafiles of the read only tablespaces do not require any special DLM lock assignment. If a tablespace has write related data (e.g., SQL insert, update, delete), but the data is logically partitioned, monitored and routed by a transaction monitor, it will be considered as a read only tablespace due to the lack of DLM lock contentions. Table 3 summarizes all the tablespace modes and their implications.

TABLE 3

Read/Write field and design implementations

| R/W field | Scenario and Implications |
|---|---|
| s | system tablespace, DLM issue.<br>private rollback tablespace, no DLM issue.<br>private rollback, no DLM issue. |
| r | read only tablespace.<br>good for DSS environment.<br>No DLM issue. |
| w | write based tablespace.<br>DLM issue. |
| t | tablespace used under transaction monitor.<br>No DLM issue. |

It is important to note that the tablespace 'Read/Write field' will directly affect the gc_db_locks and the gc_files_to_lock allocation (locks to files allocation).

'RR/RP field' specifies whether the associated tablespace should be distributed by the program 40 using Round Robin (RR) policy or Range Partition (RP) policy. The default is RR. That is, unless the user wants to use range partition or group separation, this field in the PROGRAM DESIGN input can be left blank. Table 4 shows the RR/RP field and design implementations.

TABLE 4

RR/RP field and design implementations

| RR/RP field | Scenario and Implications |
|---|---|
| r<br>(default) | datafiles of the field associated tablespace will be spread among nodelist in a round robin fashion. |
| p | datafiles of the field associated tablespace will be spread among nodelist in a range partition way. |

These two fields, used by the PROGRAM DESIGN, sets the strategy to be used by the program 40 for this tablespace. These two fields are not mandatory fields required by the PROGRAM DESIGN.

'Group separation tag' is a 2 digits numeric tag used by the PROGRAM DESIGN to guarantee all tablespaces having the same tag number will be allocated on different disks (not necessary different nodes). All input request lines of the same group in the PROGRAM DESIGN should be placed adjacent to each other. The most used application is to separate index(es) from table(s).

(E) Initial/Next extents.

Input of Initial/Next extent size of a tablespace is an user option. The program 40 will provide defaults if a user leaves both fields blank or Next field blank.

Segment header datafile

The user needs to aware that specifying a small initial extent of the tablespace which is less than 1 PP might cause the program 40 to allocate an additional segment header file in addition to all the tablespace datafiles. That is, if a user provides an initial extent smaller than one physical partition of the associated volume group, the program 40 will automatically create an additional special segment header datafile which is slightly larger than the initial extent. The purpose of providing this feature is that it allows a user to allocate one DLM lock per block if the segment header is heavily contended.

Since one aspect of the present invention is a configuration language, it has reserved keywords. The designer should use them with discretion. All keywords used by the program 40 are NOT case sensitive. Table 5 shows the reserved keywords and their interpretations.

TABLE 5

Reserved Keywords.

| Keyword | Interpretation |
|---|---|
| all_nodes | One tablespace spread across all nodes listed in the configuration file |
| ctl | control file. |
| dss | indicates DSS database design is required. |
| each_node | Each node listed in the configuration file has a unique tablespace. |
| max | Logical volume maximum allocation policy. |
| min | Logical volume minimum allocation policy. |
| node=Nodelist | One tablespace spread across all nodes specified in the Nodelist. |
| log1, log2 ..<br>log1a, log1b ..<br>log2a, log2b .. | redo log 1, 2 ..<br>redo log mirroring. |
| .... .... | |
| oltp | indicates OLTP database design is required. |
| rb | rollback tablespace. |
| sys | system tablespace. |
| tmp | tmp tablespace. |
| usr | DBA default and temporary tablespace. |
| # | If placed as the 1st character, the entire line will be treated as a comment. |
| blank lines | will be ignored |

The following are samples of datafiles of the present invention:

(a) sample of a configuration file 42

| Node# | Memory | Disk_Size(MB) | hdiskx | VG | PP(MB) | css0_IP | Hostname |
|---|---|---|---|---|---|---|---|
| 28 | 256 | 1916,1916,1916 | 1,2,3 | vg28 | 4 | 129.40.33.160 | v02n28.ibm.com |
| 29 | 256 | 1916,1916,1916 | 4,5,6 | vg29 | 4 | 129.40.33.161 | v02n29.ibm.com |
| 30 | 256 | 1916,1916,1916 | 1,3,5 | vg30 | 4 | 129.40.33.162 | v02n30.ibm.com |
| 31 | 256 | 1916,1916,1916 | 2,4,6 | vg31 | 4 | 129.40.33.163 | v02n31.ibm.com |
| 32 | 256 | 1916,1916 | 1,2 | vg32 | 4 | 129.40.33.164 | v02n32.ibm.com |
| 33 | 256 | 1916,1916,1916 | 1,2,3 | vg33 | 2 | 129.40.33.165 | v02n33.ibm.com |

-- remarks:
(1) The program 40 supports a different number of disks per node. e.g., nodes 28, 29, 30, 31 and 33 have 3 disks each, but node 32 has only 2 disks.
(2) The program 40 supports different Physical Partition (PP) sizes. e.g. nodes 28, 29, 30, 31 and 32 have a 4 MB PP size while node 33 has a 2 MB PP size.

(b) Sample of a DSS PROGRAM DESIGN with Input file,
Input_PD (See 43 at FIGS. 3 and 4):

Database: test, BlockSize: 8K, Design: DSS, ConcurrentUsers: 30

| TS_Name | Size_MB | Mode | Stps | Operator | Alloc | Init Extents | Next Extents | % free | % used |
|---|---|---|---|---|---|---|---|---|---|
| #-- Application tablespaces | | | | | | | | | |
| pack | 3000 | r | | | | | | | |
| packidx | 400 | w | | | | | | | |
| usr | 32 | w | | | | | | | |
| dept | 64 | r | | | | | | | |
| test | 256 | w | | | | | | | |
| location | 256 | r | | | | | | | |
| tmp | 1500 | w | | | | | | | |
| skills | 800 | r | | | | | | | |
| orders | 160 | w | | | | | | | |

-- remarks:
(1) Database block size is 8K, database nature is DSS with 30 concurrent users expected for the entire complex.
(2) PROGRAM DESIGN will make up all the missing database system files.
(3) PROGRAM DESIGN will also select nodes and allocation policy for each application tablespace.

(c) Sample of an OLTP EASY DESIGN with Input file, Input_ED (See 49 at FIGS. 3 and 4):

Database: test, BlockSize: 4K, Design: OLTP, Transactions: 2500

| TS_Name | Size_MB | Mode | Stps | Operator | Alloc | Init Extents | Next Extents | % free | % used |
|---|---|---|---|---|---|---|---|---|---|
| #-- Database System files | | | | | | | | | |
| sys | 50 | s | 1 | node=28,30 | min | | | | |
| log1a | 100 | s | 1 | each_node | min | | | | |
| log1b | 100 | s | 1 | each_node | min | | | | |
| log2a | 100 | s | 1 | each_node | min | | | | |
| log2b | 100 | s | 1 | each_node | min | | | | |
| rb | 200 | s | 1 | each_node | max | | | | |
| ctl | 20 | s | 1 | node=28 | min | | | | |
| ctl | 20 | s | 1 | node=29 | min | | | | |
| #-- Application tablespaces | | | | | | | | | |
| pack | 3000 | w | 2 | all_nodes | max | | | | |
| packidx | 400 | w | 1 | all_nodes | max | 8 m | 8 m | | |
| usr | 32 | w | 1 | node=28 | min | | | | |
| scan | 512 | w | 1 | each_node | max | | | | |
| code | 512 | w | 1 | each_node | max | 16 k | | | |
| dept | 64 | w | 2 | node=29,30 | min | 16 k | | | |
| test | 256 | w | 1 | all_nodes | max | 40 k | | | |
| location | 256 | r | 1 | node=32,31,30 | max | | | | |
| tmp | 1500 | w | 1 | all_nodes | max | | | | |
| skills | 800 | r | 1 | all_nodes | min | 5000K | 5000K | | |
| orders | 160 | w | 1 | node=29,28 | min | 6000K | 6000K | | |

-- remarks:
(1) Database block size is 4K, database nature is OLTP with 2500 transactions per second expected for the entire complex.
(2) Database system tablespace (sys) has 2 LVs. Each LV is about 25 MB in size. The first LV is allocated on node 28 and the second LV is allocated on node 30. Since min allocation is specified, each LV will only get allocated on one disk.
(3) log1a, log1b, log2a, log2b will give 2 groups of redo logs for each thread (or database instance) with 2 members in each group.
(4) Each database instance (or node) has a private rollback tablespace about 200 MB in size. The names of the rollback tablespaces are rb28, rb29, rb30, rb31, rb32, rb33. The tablespace names are generated by concatenation of 'rb' with the node number. Depending on the database nature, (OLTP or DSS), different numbers of rollback segments will also get allocated after each rollback tablespace is created.
(5) There are 2 control files, ctl28 on node 28 and ctl29 on node 29. Their entries is reflected in init.ora.
(6) Application tablespace PACK is divided into 12 LVs, 2 LVs on each node. Each LV, since max allocation policy is specified, is allocated across all disks within each node. The datafiles are added to PACK tablespace in the following order: pack1n28; pack2n29; pack3n30; pack4n31; pack5n32; pack6n33; pack7n28; pack8n29; pack9n30; pack10n31; pack11n32; pack12n33.
Since tablespace mode is read/write, DLM locks is assigned to the associated datafiles.

-continued

Database: test, BlockSize: 4K, Design: OLTP, Transactions: 2500

(7) Since application tablespace, 'scan' is used with 'each_node', this statement will result in 6 tablespaces, one tablespace per node and one LV per tablespace. The 6 tablespaces are: scan28, scan29, scan30, scan31, scan32 and scan33. Each tablespace is 512 MB in size.
(8) Application tablespace DEPT has 4 LVs, 2 LVs on node 29 and another 2 LVs on node 30. Each LV is about 16 MB in size. Since the initial extent is 16k, tablespace DEPT will have a segment header file, dept0n29. The traversing order is dept0n29; dept1n29; dept2n30; dept3n29; dept4n30.
(9) Missing Initial or Next extent will be filled by the program 40.

(d) Sample of an DSS EASY DESIGN with Input file, Input_ED (See 50 at FIG. 3 and 4):

Database: test, BlockSize: 8K, Design: DSS, ConcurrentUsers: 30

| TS_Name | Size_MB | Mode | Stps | Operator | Alloc | Init Extents | Next | % free | % used |
|---|---|---|---|---|---|---|---|---|---|
| #-- Database System files | | | | | | | | | |
| sys | 50 | s | 1 | node=28 | min | | | | |
| log1 | 100 | s | 1 | each_node | min | | | | |
| log2 | 100 | s | 1 | each_node | min | | | | |
| rb | 200 | s | 1 | each_node | max | | | | |
| ctl | 20 | s | 1 | node=28 | min | | | | |
| ctl | 20 | s | 1 | node=29 | min | | | | |
| #-- Application tablespaces | | | | | | | | | |
| pack | 3000 | r | 2 | all_nodes | max | | | | |
| packidx | 400 | w | 1 | all_nodes | max | 16 k | | | |
| usr | 32 | w | 1 | node=28 | min | | | | |
| dept | 64 | r | 2 | node=29,30 | min | 16 k | | | |
| test | 256 | w | 1 | all_nodes | max | 40 k | | | |
| location | 256 | r | 1 | node=32,31,30 | max | | | | |
| tmp | 1500 | w | 1 | all_nodes | max | | | | |
| skills | 800 | r | 1 | all_nodes | min | 5000K | 5000K | | |
| orders | 160 | w | 1 | node=29,28 | min | | | | |

-- remarks:
(1) Oracle block size is 8K, database nature is DSS with 30 concurrent users expected for the entire complex.

(e) Sample of the three stages cascade design.
The sample cascade design is based on the following hardware configuration. 40

| Node# | Memory | Disk_Size(MB) | hdiskx | VG | PP | css0_IP | Hostname |
|---|---|---|---|---|---|---|---|
| 28 | 256 | 1916,1916,1916 | 1,2,3 | vg28 | 4 | 129.40.33.160 | v02n28.ibm.com |
| 29 | 256 | 1916,1916,1916 | 4,5,6 | vg29 | 4 | 129.40.33.161 | v02n29.ibm.com |

(1) Designer prepares the following PROGRAM DESIGN phase 44 input, Input_PD 43 of Fig. 4. Note that only minimum inputs are required. These required inputs are database name, database block size, database nature (DSS/OLTP), number of concurrent users and the name, size and mode of each application tablespace.
Database:
demo, BlockSize: 8K, Design: DSS, ConcurrentUsers: 30

| TS_Name | Size_MB | Mode | Stps | Operator | Alloc | Init Extents | Next | % free | % used |
|---|---|---|---|---|---|---|---|---|---|
| emp | 800 | w | | | | | | | |
| empidx | 400 | w | | | | | | | |
| usr | 32 | r | | | | | | | |

(2) Designer executes PROGRAM DESIGN phase 44, which generates intermediate design output 61, the input required by EASY DESIGN phase 45.
Note that PROGRAM DESIGN phase 44 not only generated the missing database system files 61: sys (system tablespace), ctl (control files), logs (redo logs) and rb(private rollback tablespaces) and their physical layout, it also determines the physical layout of application tablespace emp, empidx and usr. At this stage, designer can review and modify this generated input file 61 to EASY DESIGN phase 45 at input_ED 49, if needed, before executing EASY DESIGN phase 45.

-continued

Database:
demo, BlockSize: 8K, Design: DSS, ConcurrentUsers: 30

| TS_Name | Size_MB | Mode | Stps | Operator | Alloc | Init Extents | Next | % free | % used |
|---------|---------|------|------|----------|-------|--------------|------|--------|--------|
| sys     | 60      | s    | 1    | node=28  | max   |              |      |        |        |
| ctl     | 20      | s    | 1    | node=28  | min   |              |      |        |        |
| ctl     | 20      | s    | 1    | node=29  | min   |              |      |        |        |
| log1    | 52      | s    | 1    | each_node| min   |              |      |        |        |
| log2    | 52      | s    | 1    | each_node| min   |              |      |        |        |
| log3    | 52      | s    | 1    | each_node| min   |              |      |        |        |
| rb      | 200     | s    | 1    | each_node| max   |              |      |        |        |
| emp     | 816     | w    | 2    | all_nodes| max   |              |      |        |        |
| empidx  | 408     | w    | 1    | all_nodes| max   |              |      |        |        |
| usr     | 32      | r    | 1    | node=29  | min   |              |      |        |        |

(3) Designer executes EASY DESIGN phase 45, which generates intermediate design output 62, the input required by DETAIL DESIGN phase 46. It will be understood that this is basically a logical volume map 62, which specifies the tablespace grouping via TsPhysical (physical tablespace name) and TsLogical (logical tablespace name), the name of each logical volume, and the assocaited attributes (such as, node number, volume group, disks involved, size and mode).
At this stage, designer can review and modify this generated input file 62 to DETAIL DESIGN phase 46 at input_DD 50, to further customize database physical layout detail if needed before executing DETAIL DESIGN phase 46.

Database:
demo, BlockSize: 8K Design: DSS, ConcurrentUsers: 30,
LVs: 18, DataFiles: 10, Size: 2076 MB

| Node# | LV_Name    | VG   | hdiskx | LV_Size (MB) | Ts Physical | Ts Logical | Mode |
|-------|------------|------|--------|--------------|-------------|------------|------|
| 28    | sys1n28    | vg28 | 1,2,3  | 60           | sys         | =          | s    |
| 28    | ctln28     | vg28 | 1      | 20           | ctl         | =          | s    |
| 28    | log1n28    | vg28 | 2      | 52           | log1        | =          | s    |
| 28    | log2n28    | vg28 | 3      | 52           | log2        | =          | s    |
| 28    | log3n28    | vg28 | 1      | 52           | log3        | =          | s    |
| 28    | rbn28      | vg28 | 1,2,3  | 204          | rb          | =          | s    |
| 28    | emp1n28    | vg28 | 1,2,3  | 204          | emp         | =          | w    |
| 28    | emp3n28    | vg28 | 1,2,3  | 204          | emp         | =          | w    |
| 28    | empidx2n28 | vg28 | 1,2,3  | 204          | empidx      | =          | w    |
| 29    | ctln29     | vg29 | 4      | 20           | ctl         | =          | s    |
| 29    | log1n29    | vg29 | 5      | 52           | log1        | =          | s    |
| 29    | log2n29    | vg29 | 6      | 52           | log2        | =          | s    |
| 29    | log3n29    | vg29 | 4      | 52           | log3        | =          | s    |
| 29    | rbn29      | vg29 | 4,5,6  | 204          | rb          | =          | s    |
| 29    | emp2n29    | vg29 | 4,5,6  | 204          | emp         | =          | w    |
| 29    | emp4n29    | vg29 | 4,5,6  | 204          | emp         | =          | w    |
| 29    | empidx1n29 | vg29 | 4,5,6  | 204          | empidx      | =          | w    |
| 29    | usr1n29    | vg29 | 5      | 32           | usr         | =          | r    |

(4) Designer executes DETAIL DESIGN phase 46, which generates all necessary scripts (AIX command scripts, PSSP VSD command scripts and SQL scripts) to implement the physical database.

Figure 6B:
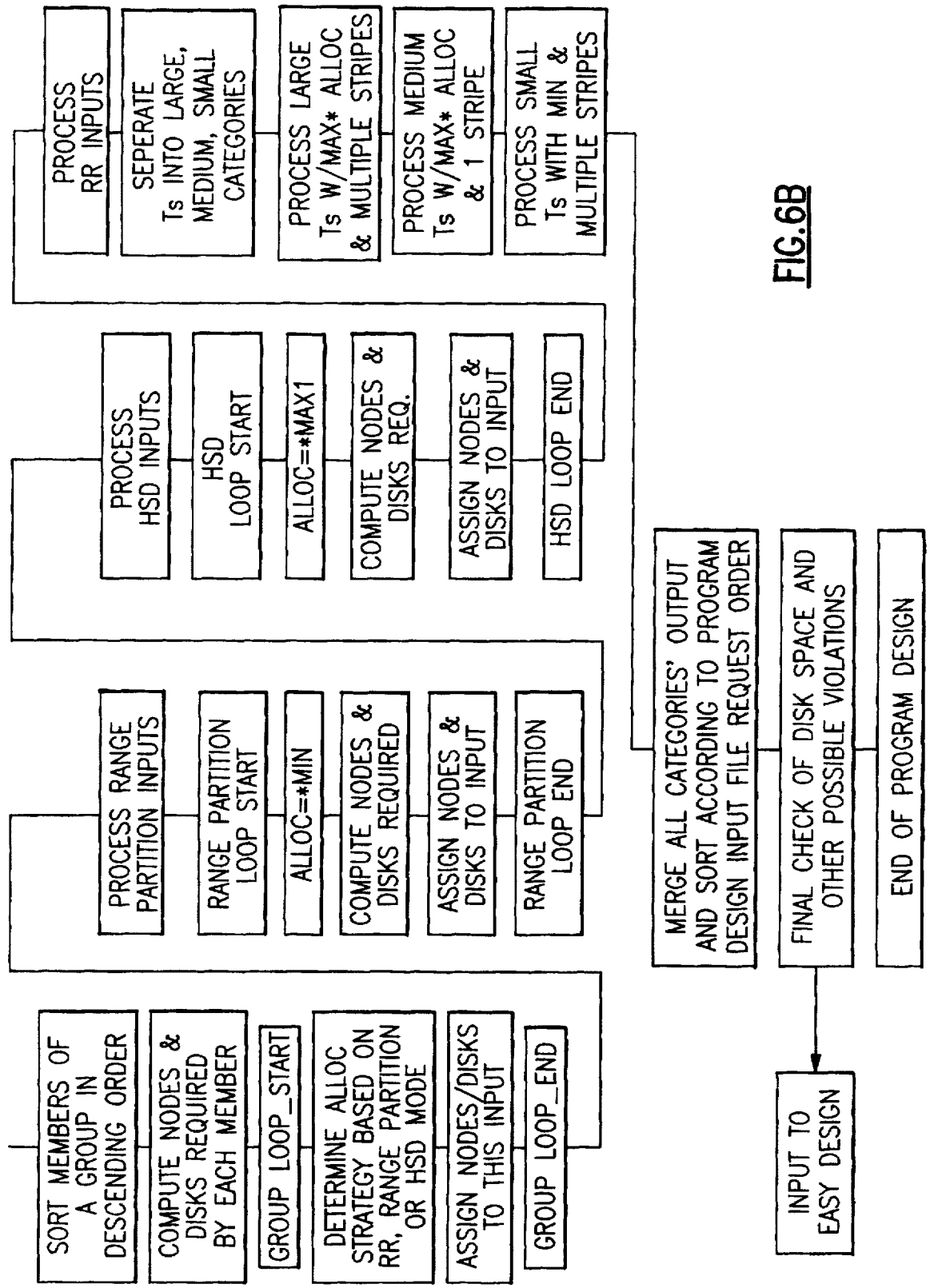
Figure 7B:
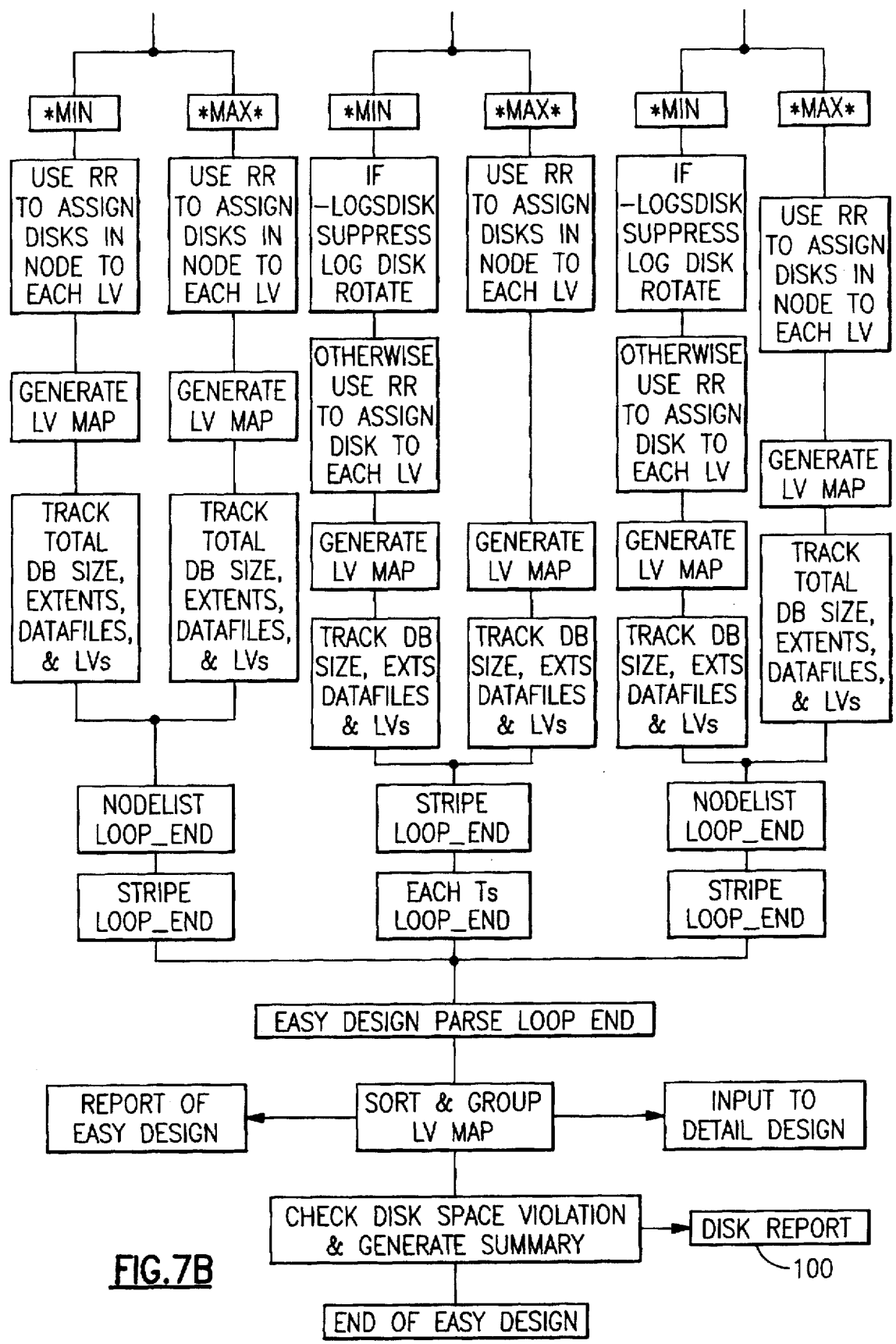
Figure 8:
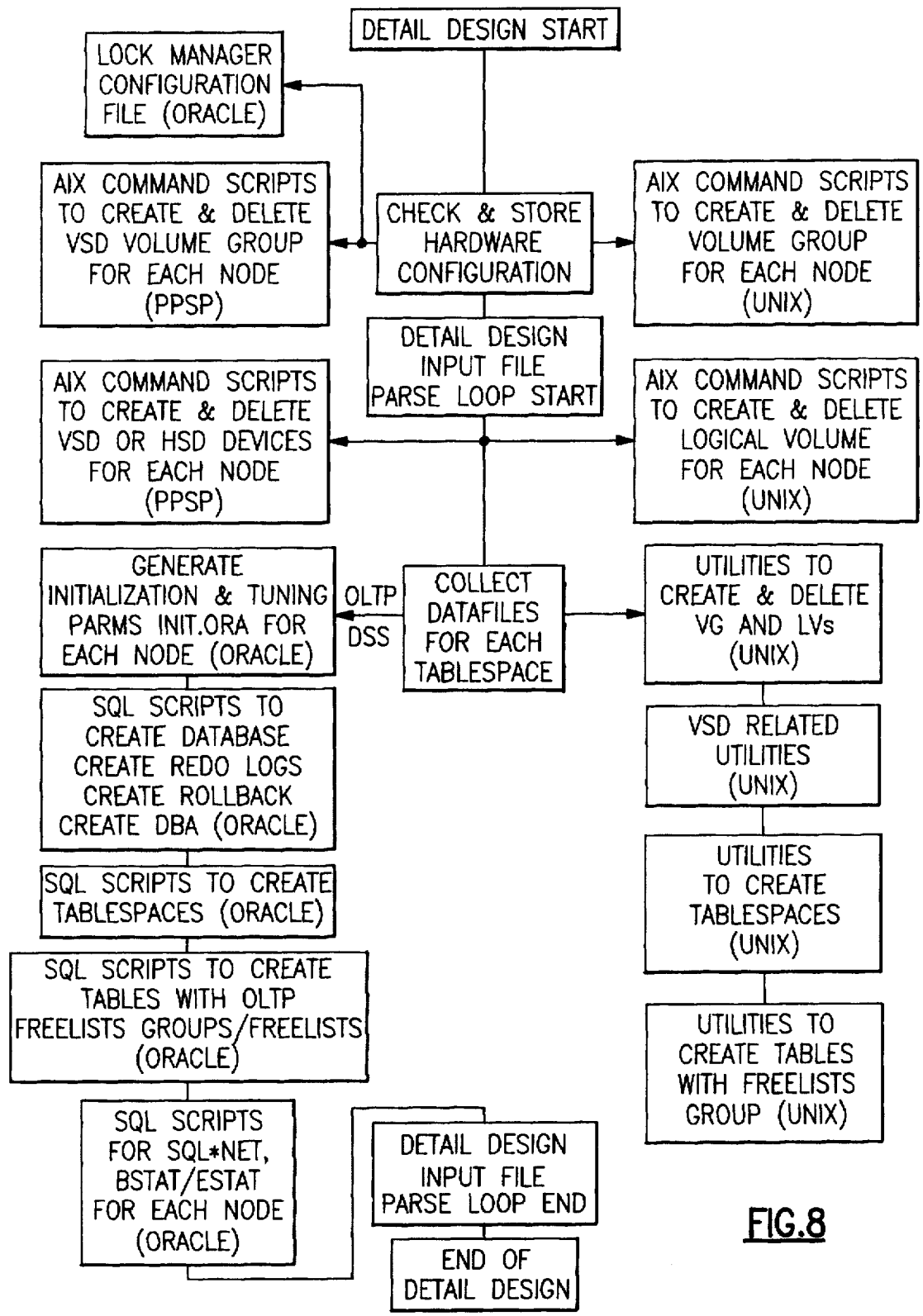
FIGS. 8 is a flowchart of a DETAIL DESIGN phase portion of the program of FIGS. 3 and 4.

FIGS. 6A–6B, when taken together as shown in FIG. 6, is a flowchart of the PROGRAM DESIGN phase 44 of the program 40 of FIGS. 3 and 4. FIG. 7A–7B, when taken together as shown in FIG. 7, is a flowchart of the EASY DESIGN phase 45 of the program 40 of FIGS. 3 and 4. FIG. 8 is a flowchart of the DETAIL DESIGN phase 46 of the program 40 of FIGS. 3 and 4.

While I have illustrated and described the preferred embodiment of my invention, it is to be understood that I do not limit myself to the precise construction herein disclosed, and the right is reserved to all changes and modifications coming within the scope of the invention as defined in the appended claims.

Having thus described my invention, what I claim as new, and desire to secure by Letters Patent is:

1. A method for establishing a physical database layout for use with a distributed processor system, the method comprising the steps of:

inputting a first datafile representing the physical configuration of the distributed processor system;

inputting a second datafile representing tablespaces to be stored in the distributed processor, said second datafile including a name and size of each tablespace in said second datafile;

determining from said first datafile the number of nodes available in the distributed processor system, the number of disks per available node, and the size of each of the disks in the distributed processor system;

performing a PROGRAM DESIGN phase for automatically allocating the tablespaces to the nodes and disks in the nodes determined to be available and updating the second datafile with the allocations;

providing for the modification of the allocation of the tablespaces in said second datafile by a user;

performing an EASY DESIGN phase for automatically assigning each tablespace into a logical volume in disk space of the disks in the distributed processor system, and generating therefrom a logical volume map including an indication of the node, disk, volume group and size of the tablespaces thus assigned;

selecting the nodes on which the tablespaces are going to be assigned;

providing for the modification of the logical volume map by a user; and performing a DETAIL DESIGN phase for automatically generating scripts for implementing the physical database layout from said logical volume map.

2. The method of claim 1 wherein the selecting of nodes comprises spreading said tablespaces evenly across all of the nodes in said first datafile.

3. The method of claim 1 wherein the selecting of nodes comprises assigning each node in said first datafile with its own unique tablespace.

4. The method of claim 1 wherein the selecting of nodes comprises selecting a subset of nodes from the first datafile to be used with a designated tablespace.

5. The method of claim 1 wherein the EASY DESIGN phase includes striping a very large tablespace wherein the very large tablespace is evenly spread out over the selected nodes.

6. The method of claim 1 wherein the EASY DESIGN phase includes allocating the logical volumes in accordance with a logical volume allocation (LVM) policy.

7. The method of claim 6 wherein the LVM allocation policy allocates the logical volume across a designated set of disks.

8. The method of claim 6 wherein the LVM allocation policy allocates the logical volume across all available disks in a node.

9. The method of claim 6 wherein the LVM allocation policy allocates the logical volume on one disk.

10. The method of claim 1 further comprising designating whether the tablespaces are to be spread among the nodes in either a round robin fashion or a range partition fashion.

11. The method of claim 1 further comprising designating whether each tablespace is to be a read based or a write based tablespace, and wherein said DETAIL DESIGN phase assigns distributed lock manager locks for each tablespace designated as a write tablespace.

12. The method of claim 1 further comprising designating a size for the initial and next extents of a desired tablespace, and further comprises spreading the desired tablespace across disks dependent on the designated initial and next extent sizes.

13. The method of claim 1 wherein said distributed processor system has layers of software for operating said distributed processor system, said layers including an application layer for implementing a database, a parallel operating layer for operating the distributed processor system in a parallel fashion, and a node operating system layer for operating each node, said DETAIL DESIGN phase for generating scripts for the node operating system layer, the parallel operating layer, and the application layer, respectively.

14. The method of claim 1 wherein said EASY DESIGN phase creates a disk report including disk capacity, disk space allocated and disk space available for every node in said first datafile.

15. A method for implementing a physical database layout for use with a distributed processor system, the method comprising the steps of:

inputting a first datafile representing the physical configuration of the distributed processor system;

inputting a second datafile representing tablespaces to be stored in the distributed processor, said second datafile including a name and size of each tablespace in said second datafile;

determining from said first datafile the number of nodes available in the distributed processor system, the number of disks per available node, and the size of each of the disks in the distributed processor system;

performing a PROGRAM DESIGN phase for automatically allocating the tablespaces to the nodes and disks in the nodes determined to be available and updating the second datafile with the allocations;

providing for the modification of the allocation of the tablespaces in said second datafile by a user;

performing an EASY DESIGN phase for automatically assigning each tablespace into a logical volume in disk space of the disks in the distributed processor system, and generating therefrom a logical volume map including an indication of the node, disk, volume group and size of the tablespaces thus assigned;

providing for the modification of the logical volume map by a user; and performing a DETAIL DESIGN phase for automatically generating scripts for implementing the physical database layout from said logical volume map; and designating a size for the initial and next extents of a desired tablespace, and spreading the desired tablespace across disks dependent on the designated initial and next extent sizes;

wherein said distributed processor system has layers of software for operating said distributed processor system, said layers including an application layer for implementing a database, a parallel operating layer for operating the distributed processor system in a parallel fashion, and a node operating system layer for operating each node, said DETAIL DESIGN phase for generating scripts for the node operating system layer, the parallel operating layer, and the application layer, respectively, and wherein said application layer is an Oracle layer, said parallel operating layer is a PSSP and VSD layer, and said node operating system layer is an AIX layer, and said DETAIL DESIGN layer generates AIX command scripts, VSD scripts, and Oracle scripts, in that order.

16. A program recorded on a computer readable medium, said program for establishing a physical database layout for use with a distributed processor system by a method comprising the steps of:

inputting a first datafile representing the physical configuration of the distributed processor system;

inputting a second datafile representing tablespaces to be stored in the distributed processor, said second datafile including a name and size of each tablespace in said second datafile;

determining from said first datafile the number of nodes available in the distributed processor system, the number of disks per available node, and the size of each of the disks in the distributed processor system;

performing a PROGRAM DESIGN phase for automatically allocating the tablespaces to the nodes and disks in the nodes determined to be available and updating the second datafile with the allocations;

providing for the modification of the allocation of the tablespaces in said second datafile by a user;

performing an EASY DESIGN phase for automatically assigning each tablespace into at least one logical volume in disk space of the disks in the distributed processor system, and generating therefrom a logical volume map including an indication of the node, disk, volume group and size of the tablespaces thus assigned;

selecting the nodes on which the tablespaces are going to be assigned;

providing for the modification of the logical volume map by a user; and performing a DETAIL DESIGN phase for automatically generating scripts for implementing the physical database layout from said logical volume map.

17. The program of claim 16 wherein the selecting of nodes comprises spreading said tablespaces evenly across all of the nodes in said first datafile.

18. The program of claim 16 wherein the selecting of nodes comprises assigning each node in said first datafile with its own unique tablespace.

19. The program of claim 16 wherein the selecting of nodes comprises selecting a subset of nodes from the first datafile to be used with a designated tablespace.

20. The program of claim 16 wherein the EASY DESIGN phase includes striping a very large tablespace wherein the very large tablespace is evenly spread out over the selected nodes.

21. The program of claim 16 wherein the EASY DESIGN phase includes allocating the logical volumes in accordance with a logical volume allocation (LVM) policy.

22. The program of claim 21 wherein the LVM allocation policy allocates the logical volume across a designated set of disks.

23. The program of claim 21 wherein the LVM allocation policy allocates the logical volume across all available disks in a node.

24. The program of claim 21 wherein the LVM allocation policy allocates the logical volume on one disk.

25. The program of claim 16 further comprising designating whether the tablespaces are to be spread among the nodes in either a round robin fashion or a range partition fashion.

26. The program of claim 16 further comprising designating whether each tablespace is to be a read based or a write based tablespace, and wherein said DETAIL DESIGN phase assign distributed lock manager locks for each tablespace designated as a write based tablespace.

27. The program of claim 16 further comprising designating a size for the initial and next extents of a desired tablespace, and further comprises spreading the desired tablespace across disks dependent on the designated initial and next extent sizes.

28. The program of claim 16 wherein said distributed processor system has layers of software for operating said distributed processor system, said layers including an application layer for implementing a database, a parallel operating layer for operating the distributed processor system in a parallel fashion, and a node operating system layer for operating each node, said DETAIL DESIGN phase for generating scripts for the node operating system layer, the parallel operating layer, and the application layer, respectively.

29. A program recorded on a computer readable medium, said program for implementing a physical database layout for use with a distributed processor system by a method comprising the steps of:

inputting a first datafile representing the physical configuration of the distributed processor system;

inputting a second datafile representing tablespaces to be stored in the distributed processor, said second datafile including a name and size of each tablespace in said second datafile;

determining from said first datafile the number of nodes available in the distributed processor system, the number of disks per available node, and the size of each of the disks in the distributed processor system;

performing a PROGRAM DESIGN phase for automatically allocating the tablespaces to the nodes and disks in the nodes determined to be available and updating the second datafile with the allocations;

providing for the modification of the allocation of the tablespaces in said second datafile by a user;

performing an EASY DESIGN phase for automatically assigning each tablespace into at least one logical volume in disk space of the disks in the distributed processor system, and generating therefrom a logical volume map including an indication of the node, disk, volume group and size of the tablespaces thus assigned;

providing for the modification of the logical volume map by a user; and performing a DETAIL DESIGN phase for automatically generating scripts for implementing the physical database layout from said logical volume map; and wherein said distributed processor system has layers of software for operating said distributed processor system, said layers including an application layer for implementing a database, a parallel operating layer for operating the distributed processor system in a parallel fashion, and a node operating system layer for operating each node, said DETAIL DESIGN phase for generating scripts for the node operating system layer, the parallel operating layer, and the application layer, respectively, and wherein said application layer is an Oracle layer, said parallel operating layer is a PSSP and VSD layer, and said node operating system layer is an AIX layer, and said DETAIL DESIGN layer generates AIX command scripts, VSD scripts, and Oracle scripts, in that order.

30. The program of claim 16 wherein said EASY DESIGN phase creates a disk report including disk capacity, disk space allocated and disk space available for every node in said first datafile.

* * * * *